US011279374B2

(12) United States Patent
Oishi

(10) Patent No.: US 11,279,374 B2
(45) Date of Patent: Mar. 22, 2022

(54) DRIVING FORCE CONTROL APPARATUS

(71) Applicant: TOYOTA JIDOSHA KABUSHIKI KAISHA, Toyota (JP)

(72) Inventor: Masashi Oishi, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 154 days.

(21) Appl. No.: 16/408,641

(22) Filed: May 10, 2019

(65) Prior Publication Data
US 2019/0359224 A1 Nov. 28, 2019

(30) Foreign Application Priority Data

May 28, 2018 (JP) .............................. JP2018-101343

(51) Int. Cl.
*B60W 50/12* (2012.01)
*B60W 40/08* (2012.01)

(52) U.S. Cl.
CPC ............ *B60W 50/12* (2013.01); *B60W 40/08* (2013.01); *B60W 2040/0863* (2013.01); *B60W 2540/10* (2013.01)

(58) Field of Classification Search
None
See application file for complete search history.

(56) References Cited

U.S. PATENT DOCUMENTS

| | | | | |
|---|---|---|---|---|
| 6,311,116 B1* | 10/2001 | Lee | ........................ | B60K 28/10 303/121 |
| 8,002,058 B2* | 8/2011 | Ishikawa | ............... | B60W 10/06 180/65.265 |
| 9,061,561 B2* | 6/2015 | Kikuchi | ............. | B60G 17/0195 |
| 9,145,115 B2* | 9/2015 | Oishi | ................... | B60W 10/119 |
| 10,829,128 B2* | 11/2020 | Hoshikawa | ....... | B60W 50/0097 |
| 2007/0102208 A1* | 5/2007 | Okuda | .................. | B60W 10/02 180/65.31 |
| 2007/0142169 A1* | 6/2007 | Marcil | .................. | B60Q 9/008 477/107 |
| 2008/0228363 A1* | 9/2008 | Kouno | .................. | B60W 10/11 701/54 |
| 2010/0105523 A1* | 4/2010 | Hrovat | ................. | B60W 10/06 477/175 |

(Continued)

FOREIGN PATENT DOCUMENTS

| | | | | |
|---|---|---|---|---|
| JP | 2013155631 A | * | 1/2012 | ............. B60K 28/10 |
| JP | 2013-155631 A | | 8/2013 | |
| WO | 2015/136664 A1 | | 9/2015 | |

Primary Examiner — Kelly D Williams
Assistant Examiner — Tischi Balachandra
(74) Attorney, Agent, or Firm — Sughrue Mion, PLLC

(57) ABSTRACT

A driving force control apparatus including an ECU configured to detect a specific state of a vehicle, wherein the vehicle is not traveling even though an accelerator pedal of the vehicle is operated. The ECU of the driving force control apparatus being configured to acquire, when the specific state is detected, a travel distance of the vehicle from a time point when the specific state last ended. The ECU of the driving force control apparatus being configured to start driving-force-limitation mitigation control without requiring the specific state currently detected to continue for a predetermined period or longer, when the travel distance is a distance corresponding to a wheelbase.

3 Claims, 5 Drawing Sheets

(56) References Cited

U.S. PATENT DOCUMENTS

| | | | | |
|---|---|---|---|---|
| 2010/0197457 A1* | 8/2010 | Kuwahara | F02D 41/023 | 477/107 |
| 2010/0298092 A1* | 11/2010 | Tsuchikawa | B60W 10/08 | 477/71 |
| 2012/0116650 A1* | 5/2012 | Miyazaki | F02D 29/02 | 701/102 |
| 2012/0143456 A1* | 6/2012 | Ueda | B60W 40/06 | 701/93 |
| 2012/0179304 A1* | 7/2012 | Tokumochi | B60W 50/10 | 701/1 |
| 2012/0191313 A1* | 7/2012 | Miyahara | B60W 10/184 | 701/70 |
| 2012/0221209 A1* | 8/2012 | Tatsukawa | B60W 10/06 | 701/42 |
| 2012/0296541 A1* | 11/2012 | Matsushita | F02D 41/045 | 701/70 |
| 2013/0030648 A1* | 1/2013 | Matsumoto | B60W 30/02 | 701/37 |
| 2013/0030674 A1* | 1/2013 | Minase | F02D 41/021 | 701/110 |
| 2013/0041564 A1* | 2/2013 | Doi | B60W 50/087 | 701/70 |
| 2015/0203117 A1* | 7/2015 | Kelly | B60K 31/02 | 701/91 |
| 2015/0217766 A1* | 8/2015 | Kelly | F16H 61/0213 | 701/94 |
| 2015/0217769 A1* | 8/2015 | Fairgrieve | B60T 8/175 | 701/93 |
| 2015/0232093 A1* | 8/2015 | Fairgrieve | B60T 8/175 | 701/90 |
| 2015/0284000 A1* | 10/2015 | Hayakawa | B60W 40/06 | 701/70 |
| 2015/0291030 A1* | 10/2015 | Oiki | B60K 28/00 | 701/70 |
| 2015/0291031 A1* | 10/2015 | Morimoto | G06K 9/00812 | 701/70 |
| 2015/0321555 A1* | 11/2015 | Fukata | B60K 28/10 | 701/70 |
| 2015/0321667 A1* | 11/2015 | Fukata | B60K 28/00 | 701/70 |
| 2016/0137197 A1* | 5/2016 | Hayakawa | B60K 28/10 | 701/70 |
| 2016/0185327 A1* | 6/2016 | Ishida | B60W 10/188 | 701/74 |
| 2016/0185350 A1* | 6/2016 | Kelly | B60W 30/18 | 701/94 |
| 2016/0200300 A1* | 7/2016 | Ishida | B60T 8/175 | 701/83 |
| 2016/0214604 A1* | 7/2016 | Kida | B60T 7/22 | |
| 2016/0325748 A1* | 11/2016 | Mori | B60W 10/08 | |
| 2017/0022925 A1* | 1/2017 | Kim | G07C 5/0808 | |
| 2019/0344793 A1* | 11/2019 | Frerichs | B60W 10/04 | |

\* cited by examiner

DRIVING FORCE CONTROL APPARATUS

CLAIM OF PRIORITY

The present application claims priority from Japanese patent application JP 2018-101343 filed on May 28, 2018, the content of which is hereby incorporated by reference into this application.

BACKGROUND

1. Technical Field

The present disclosure relates to a driving force control apparatus configured to detect an erroneous depression operation, which is an operation by a driver of depressing an accelerator pedal by mistake, to thereby limit a driving force of a vehicle.

2. Description of the Related Art

Hitherto, there has been known a technology of preventing a sudden start of a vehicle due to an erroneous depression operation, which is an operation by a driver of depressing an accelerator pedal by mistake. For example, a driving support apparatus proposed in Japanese Patent Application Laid-open No. 2013-155631 is configured to detect the erroneous depression operation by a driver, to thereby to limit a driving force of a vehicle. As a result, the sudden start of the vehicle is suppressed. The driving force of the vehicle is hereinafter simply referred to as "driving force".

When an external travel load (an object obstructing the travel of the vehicle), for example, a step exists in a travel direction of the vehicle under the state in which the driving force is limited, the vehicle cannot pass over the external travel load, and the travel of the vehicle may be obstructed. For example, when the driver intentionally depresses the accelerator pedal strongly to get over the step, it may be determined that an erroneous depression operation is performed. In such a case, the driving force is limited, and wheels may thus not get over the step.

To address this problem, the driving support apparatus proposed in Japanese Patent Application Laid-open No. 2013-155631 mitigates the limitation on the driving force when the driving support apparatus detects an external travel load. As a result, the driving force can be increased.

For example, when rear wheels hit a step while the vehicle is traveling backward, and the travel of the vehicle thus stops, the driver depresses the accelerator pedal strongly to get over the step. In this case, in the apparatus proposed in Japanese Patent Application Laid-open No. 2013-155631, when the accelerator pedal is suddenly depressed, the pedal operation is determined as the erroneous depression operation, and the driving force is thus limited. Then, when a state in which the rear wheels cannot get over the step continues for a predetermined period due to the limitation on the driving force, the mitigation of the driving force limitation is started. As a result, the rear wheels come to be able to get over the step.

When the rear wheels get over the step, the driver releases the foot from the accelerator pedal, and slowly moves the vehicle backward. When the foot is released from the accelerator pedal, the limitation on the driving force is finished.

When the vehicle travels backward, front wheels hit the step this time. When the travel of the vehicle stops again due to the step, the driver again depresses the accelerator pedal strongly. As a result, it may be determined that the erroneous depression operation is performed, and the limitation on the driving force may thus be resumed. In this case, even when the driver continues depressing the accelerator pedal, the mitigation of the driving force limitation is not started soon (until the state in which the front wheels cannot get over the step continues for the predetermined period) as in the case in which the rear wheels get over the step. Thus, although the driver is intentionally operating the accelerator pedal, the front wheels cannot get over the step smoothly. Therefore, the driver feels a sense of inconvenience.

SUMMARY

The present disclosure provides a driving force control apparatus capable of appropriately mitigating a limitation on a driving force when front wheels and rear wheels get over a step independently of each other, to thereby prevent a driver from feeling a sense of inconvenience.

A driving force control apparatus according to one embodiment includes: a driving force controller (10) configured to control a driving force to be generated by a drive device (30) for a vehicle in accordance with an operation amount of an accelerator pedal; an erroneous-depression-operation detection module (S12 to S14) programmed to detect an erroneous depression operation, which is an operation by a driver of depressing the accelerator pedal by mistake, based on an erroneous-depression determination condition set in advance; a driving force limitation module (S15) programmed to execute driving force limitation control, which is control of limiting the driving force, when the erroneous depression operation is detected; a specific state detection module (S18) programmed to detect a specific state indicating a state in which travel of the vehicle is not detected even under a state in which the accelerator pedal is operated, during a period in which the driving force is limited by the driving force limitation module; and a driving-force-limitation mitigation module (S20) programmed to start driving-force-limitation mitigation control, which is control of mitigating the limitation on the driving force by the driving force limitation module, when the specific state is continued to be detected for a predetermined period set in advance or longer, the driving-force-limitation mitigation module including: a travel distance determination module (S25, S26) programmed to acquire, when the specific state is detected, a travel distance of the vehicle from a time point when the specific state detected last disappeared, and determine whether the travel distance is a distance corresponding to a wheelbase of the vehicle; and a start condition change module (S28) programmed to start the driving-force-limitation mitigation control without requiring the specific state currently detected to continue for the predetermined period or longer, when the travel distance is the distance corresponding to the wheelbase.

In one embodiment, the driving force controller controls the driving force to be generated by the drive device for the vehicle in accordance with the operation amount of the accelerator pedal. When the driver depresses the accelerator pedal by mistake with the intention to depress a brake pedal, the vehicle starts suddenly in an undesirable manner. Thus, the erroneous-depression-operation detection module detects the erroneous depression operation, which is the operation by the driver of depressing the accelerator pedal by mistake, based on the erroneous-depression determination condition set in advance. For example, the erroneous-depression determination condition is set to a condition relating to an operation speed of the accelerator pedal and an operation amount of the accelerator pedal.

When the erroneous depression operation is detected, the driving force limitation module executes the driving force limitation control, which is the control of limiting the driving force of the vehicle. "Limiting the driving force of the vehicle" means decreasing the driving force to be generated by the drive device for the vehicle to be lower compared with a case in which the erroneous depression operation is not detected, that is, suppressing the driving force to be generated by the drive device for the vehicle.

When the driving force is limited in such a manner, the vehicle may not pass through (escape from) an external travel load, for example, a step. Thus, in one embodiment, the driving force control apparatus includes the specific state detection module and the driving-force-limitation mitigation module. The specific state detection module detects the specific state indicating the state in which the travel of the vehicle is not detected even under the state in which the accelerator pedal is operated during the period in which the driving force is limited by the driving force limitation module. This specific state indicates a state in which the vehicle cannot travel due to the external travel load. The driving-force-limitation mitigation module starts the driving-force-limitation mitigation control, which is the control of mitigating the limitation on the driving force by the driving force limitation module, when the specific state is continued to be detected for the predetermined period set in advance or longer.

For example, when the rear wheels hit a step at the time of a start of backward travel, the driver depresses the accelerator pedal strongly to get over the step. In normal cases, the accelerator pedal is not depressed strongly at the time of the start of the backward travel. Therefore, the erroneous-depression-operation detection module detects the accelerator operation by the driver as the erroneous depression operation, and the driving force limitation module executes the driving force limitation control. As a result, the driving force of the vehicle is decreased.

In this case, the driver continues depressing the accelerator pedal so that the rear wheels can get over the step. The driving force is limited at this time, and hence the rear wheels may not get over the step. In this case, the specific state detection module detects the specific state indicating the state in which the travel of the vehicle is not detected even under the state in which the accelerator pedal is operated. Then, the driving-force-limitation mitigation module starts the driving-force-limitation mitigation control of mitigating the limitation on the driving force when the specific state is continued to be detected for the predetermined period set in advance or longer. When the rear wheels get over the step as a result, the driver releases the foot from the accelerator pedal.

After the rear wheels get over the step, the front wheels hit the step this time. In this case, when the front wheels hit the step, and the travel of the vehicle thus stops, the driver depresses the accelerator pedal strongly so that the front wheels can get over the step. As a result, this pedal operation may be detected as the erroneous depression operation. In this case, as in the case of the rear wheels, the driving force limitation control is executed. Therefore, the specific state in which the travel of the vehicle is not detected even under the state in which the accelerator pedal is operated is detected. In this case, it is not required to start the driving-force-limitation mitigation control only after the specific state continues for the specific period or longer as in the case in which the rear wheels get over the step.

Thus, in one embodiment, when the specific state is detected, the travel distance determination module acquires the travel distance of the vehicle from the time point when the specific state detected last disappeared, and determines whether the travel distance is the distance corresponding to the wheelbase of the vehicle. The "disappearance of the specific state" means detection of the travel of the vehicle under the state in which the accelerator pedal is operated. For example, the specific state disappears when the wheels get over the step through the accelerator operation by the driver. The distance corresponding to the wheelbase is not always required to be the same as the wheelbase, and is only required to be a distance set to fall within a range for which, for example, various errors in the wheelbase are considered.

When the travel distance is the distance corresponding to the wheelbase, it is considered that the step causing the specific state detected last hits the other ones of the front and rear wheels, and the vehicle thus cannot travel.

Thus, the start condition change module starts the driving-force-limitation mitigation control without requiring the specific state currently detected to continue for the predetermined period or longer, when the travel distance is the distance corresponding to the wheelbase. As a result, in one embodiment, the start timing of the driving-force-limitation mitigation control can be prevented from being delayed when the vehicle gets over the step the second time. Thus, the vehicle can smoothly get over the step in accordance with the intention of the driver, and hence it is possible to prevent the driver from feeling the sense of inconvenience.

In one aspect, the driving-force-limitation mitigation module further includes: a mitigation level change module (S20, S22) programmed to measure a continuation period during which the specific state continues, and increase a mitigation level of mitigating the limitation on the driving force as the continuation period increases; a mitigation level storage (S24) configured to store the mitigation level at a time when the specific state disappears; and a start mitigation level setting module (S28) programmed to set the mitigation level stored in the mitigation level storage as a mitigation level at a time of a start of the driving-force-limitation mitigation control, when a new specific state is detected under a state in which the mitigation level is stored in the mitigation level storage (Yes in Step S18 and S19), and when the travel distance is the distance corresponding to the wheelbase of the vehicle (Yes in Step S26).

In one aspect, the driving-force-limitation mitigation module includes the mitigation level change module, the mitigation level storage, and the start mitigation level setting module.

The mitigation level change module measures the continuation period in which the specific state continues, and increases the mitigation level of mitigating the limitation on the driving force as the continuation period increases. Thus, as the continuation period of the specific state increases, the limitation on the driving force is mitigated more, to thereby enable a larger driving force to be generated. In this case, the mitigation level change module may be configured to switch the mitigation level stepwise. For example, the mitigation level change module may be programmed to switch the mitigation level between two levels as follows. That is, the mitigation level change module may be programmed to select a low mitigation level when the continuation period is less than a level switch determination period, and select a high mitigation level when the continuation period is equal to or longer than the level switch determination period.

For example, in a case where a travel resistance (difficulty to get over a step) is high, for example, in a case of a high step, the continuation period of the specific state is long. In this case, the mitigation level increases in the course of the driving-force-limitation mitigation control. Thus, the mitigation level is set in accordance with the travel resistance, and a capability of the wheels to get over a step can thus be increased. Moreover, the driving force limitation can be prevented from being mitigated at a high mitigation level at the beginning of the driving-force-limitation mitigation control, and hence it is also possible to prevent a case in which the wheels get over a step with momentum and the vehicle suddenly accelerates, and the driver thus feels a sense of unease.

The mitigation level storage stores the mitigation level at the time when the specific state disappears (time when the travel of the vehicle is started). Thus, the mitigation level at the time when the wheels get over a step or the like is stored.

The start mitigation level setting module sets the mitigation level stored in the mitigation level storage as the mitigation level at the time of the start of the driving-force-limitation mitigation control, when a new specific state is detected under the state in which the mitigation level is stored in the mitigation level storage, and when the travel distance is the distance corresponding to the wheelbase of the vehicle. For example, it is assumed that the rear wheels and the front wheels get over a common step in this order. When the front wheels hit the step and the vehicle thus comes to be unable to travel, the second specific state is detected. In this case, the driving-force-limitation mitigation control is started from the time when the second specific state is detected through use of the mitigation level at the time when the rear wheels got over the step (when the first specific state disappeared). Thus, in this aspect, the vehicle can more smoothly get over the step in accordance with the intention of the driver. As a result, it is possible to prevent the driver from feeling the sense of inconvenience.

In the description above, in order to facilitate understanding of the disclosure, reference symbols used in an embodiment of the present disclosure are enclosed in parentheses, and are assigned to each of constituent features corresponding to the embodiment. However, each of the constituent features is not limited to the embodiment defined by the reference symbols.

DESCRIPTION OF THE EMBODIMENTS

Referring to the accompanying drawings, a driving force control apparatus according to an embodiment is described below.

Figure 1:
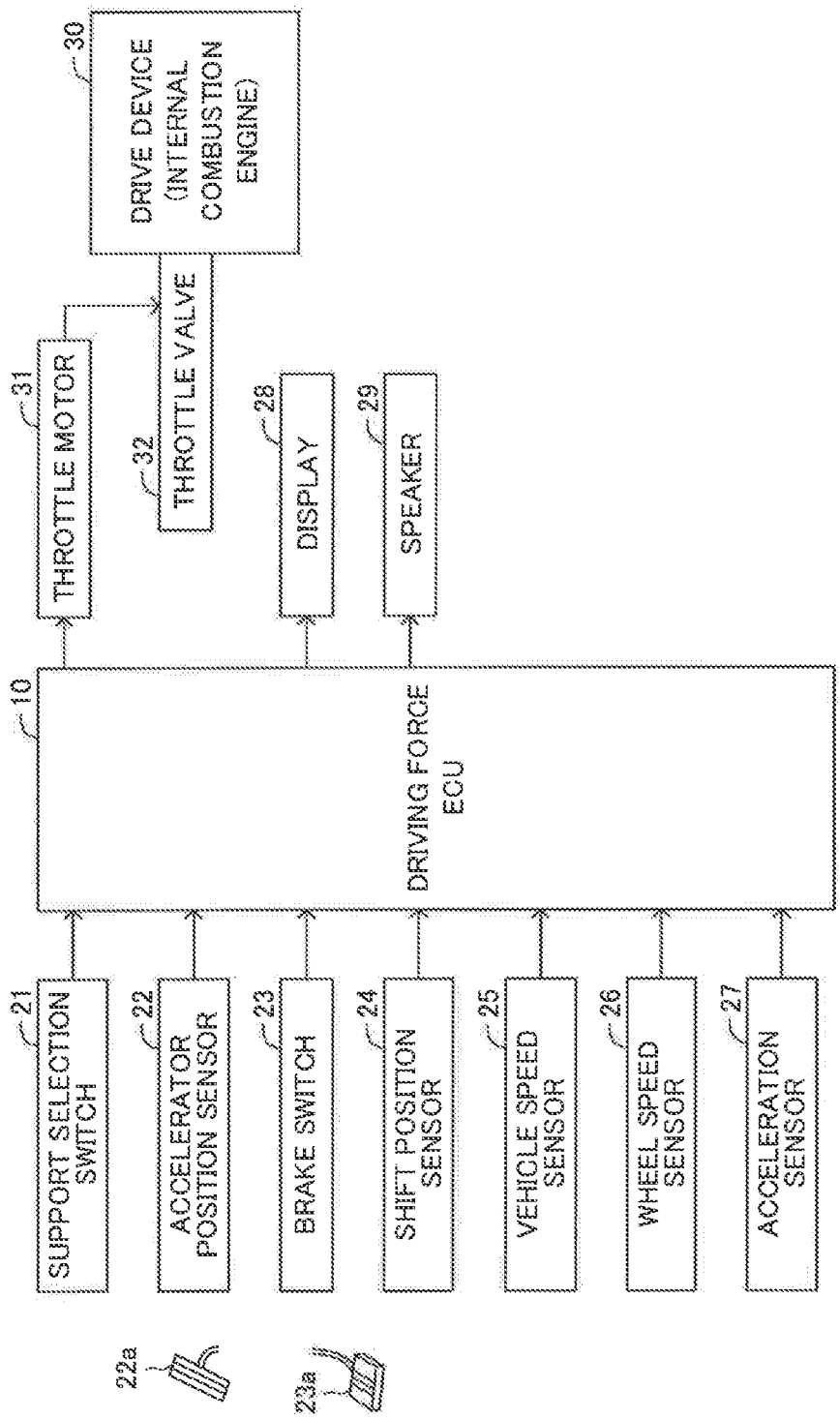
FIG. 1 is a schematic configuration diagram for illustrating a driving force control apparatus according to an embodiment.

The driving force control apparatus according to the embodiment is applied to a vehicle, and includes a driving force ECU 10 as illustrated in FIG. 1. The driving force ECU 10 is connected to other ECUs so as to be capable of mutually transmitting and receiving information via a controller area network (CAN) (not shown). For example, the driving force ECU 10 is connected to a brake ECU configured to control a braking force, a transmission ECU configured to control a shift state of an automatic transmission, and other ECUs, which are not shown. The ECU stands for an electric control unit including a microcomputer as a principal component. The microcomputer herein includes a CPU, a ROM, a RAM, a nonvolatile memory, and an interface I/F. The CPU is configured to execute instructions (programs and routines) stored in the ROM, to thereby implement various functions.

A vehicle to which the driving force control apparatus according to this embodiment is applied is a vehicle that can travel through creeping without an operation of depressing an accelerator pedal by a driver.

To the driving force ECU 10, a support selection switch 21, an accelerator position sensor 22, a brake switch 23, a swift position sensor 24, a vehicle speed sensor 25, a wheel speed sensor 26, an acceleration sensor 27, a display 28, a speaker 29, and a throttle motor 31 are connected. Each of the sensors may be connected to ECUs other than the driving force ECU 10. In such a case, the driving force ECU 10 receives, via the CAN, a detection signal of a sensor from an ECU to which the sensor is connected.

The support selection switch 21 is a switch to be used by the driver to select whether or not to permit execution of erroneous-depression-sudden-start suppression support described later. A mode in which "execution of the erroneous-depression-sudden-start suppression support is permitted" is selected by an "on" operation on the support selection switch 21. A mode in which "execution of the erroneous-depression-sudden-start suppression support is inhibited" is selected by an "off" operation on the support selection switch 21. The driving force ECU 10 stores or updates a mode each time the operation of selecting the mode is executed through the support selection switch 21. Whether the execution of the erroneous-depression-sudden-start suppression support is permitted or inhibited is determined in accordance with the last mode stored or updated.

The accelerator position sensor 22 detects an operation amount ACP (depression amount) of an accelerator pedal 22a of the vehicle, and outputs a signal indicating the accelerator pedal operation amount ACP. The accelerator pedal 22a is operated by the driver to increase a driving force generated by a drive device 30 (an internal combustion engine in this embodiment) of the vehicle. The accelerator pedal operation amount ACP detected by the accelerator position sensor 22 is hereinafter referred to as "accelerator operation amount ACP", and the operation of depressing the accelerator pedal 22a is hereinafter referred to as "accelerator operation". The accelerator operation mount ACP is "0" when the driver is not executing the accelerator operation (that is, when the foot of the driver is released from the accelerator pedal 22a), and increases as the depression amount of the accelerator pedal 22a increases.

The brake switch 23 detects presence or absence of an operation on a brake pedal 23a of the vehicle, and outputs a signal (an "on" signal or an "off" signal) in accordance with the presence or absence of the operation on the brake pedal 23a.

The shift position sensor 24 detects a position (hereinafter referred to as "shift position") of a shift lever (not shown) operated by the driver, and outputs a signal indicating a detected shift position SFT. The shift position SFT includes, for example, a position of a parking range "P", a position of a drive range "D", a position (reverse position R) of a reverse range "R", and a position of a neutral range "N". The transmission ECU (not shown) determines a gear ratio based on a shift position SFT, the accelerator operation amount ACP, and a vehicle speed V, and controls drive of a gear shift actuator (not shown) based on the gear ratio.

The vehicle speed sensor 25 outputs a signal indicating the vehicle speed V, which is a travel speed of the vehicle.

The wheel speed sensor 26 outputs a signal indicating wheel speeds w of four wheels (left/right front/rear wheels). The wheel speed sensor 26 outputs a predetermined number of pulse signals while each of the wheels rotates once. Thus, not only a rotation speed of the wheel but also a travel distance of the vehicle can be detected by counting the number of output pulse signals. When the driving force ECU 10 has a function of using the wheel speeds w of the four wheels to calculate the vehicle speed V, the connection of the vehicle speed sensor 25 is not required.

The acceleration sensor 27 outputs an acceleration signal indicating an acceleration G in a forward/backward direction of the vehicle.

The display 28 is a head-up display configured to receive a display signal from the driving force ECU 10, and show display information indicated by the display signal in a partial region (display region) of a front windshield of the vehicle. The display 28 is not limited to the head-up display, and may be a display provided on an instrument panel or the like.

When the speaker 29 receives an output signal, which is an instruction to output a warning sound, from the driving force ECU 10, the speaker 29 outputs the warning sound (for example, a buzzer sound) in response to the received output signal.

The throttle motor 31 receives a valve adjustment signal from the driving force ECU 10, and adjusts an opening degree of a throttle valve 32 of the drive device 30 (internal combustion engine) based on the received valve adjustment signal. The valve adjustment signal includes a target opening degree of the throttle valve 32. The target opening degree is set so as to increase as a driver-requested driving force corresponding to the accelerator operation amount increases.

The throttle motor 31 rotates a throttle valve 32 so that the opening degree of the throttle valve 32 matches the target opening degree included in the valve adjustment signal. Thus, as the target opening degree increases, the opening degree of the throttle valve increases, and hence an air amount (intake air amount) taken into the drive device 30 increases. Therefore, as the accelerator operation amount increases, the driving force of the vehicle generated by the drive device 30 increases. The driving force ECU 10 corresponds to a driving force controller in one embodiment of the present disclosure.

The driving force ECU 10 is connected to various sensors (not shown, for example, a throttle opening degree sensor) configured to output signals indicating a control state of the drive device 30, to be able to detect or estimate the control state of the drive device 30, for example, an actual driving force output by the drive device 30.

<Erroneous-Depression-Sudden-Start Suppression Support>

A description is now given of an overview of the erroneous-depression-sudden-start suppression support.

Depression of the accelerator pedal 22a by mistake by the driver is referred to as "erroneous depression operation". When the erroneous depression operation is carried out, a vehicle behavior (for example, a sudden start of the vehicle) that is not intended by the driver occurs.

Thus, the driving force ECU 10 estimates whether or not the erroneous depression operation is performed by the driver. Then, when the erroneous depression operation is detected (precisely, when it is estimated that the erroneous depression operation is performed) the driving force ECU 10 decreases the driving force to be generated by the drive device 30 to be lower compared with that in a normal state (when the erroneous depression operation is not detected). As a result, the vehicle behavior that is not intended by the driver can be suppressed. Control of suppressing/limiting the driving force to suppress the sudden start that is not intended by the driver when the erroneous depression operation is detected in such a manner is referred to as "erroneous-depression-sudden-start suppression support". In this embodiment, the erroneous-depression-sudden-start suppression support is executed when the vehicle is traveling backward, that is, the shift lever position SFT is set to the reverse range "R".

A description is now given of the estimation of the erroneous depression operation when the driver moves backward the vehicle.

When the driver wants to start the parked vehicle forward, the driver changes the shift lever position from the position of the parking range "P" to the position of the drive range "D" while depressing the brake pedal 23a. Then, the driver depresses the accelerator pedal 22a relatively strongly and fast.

Meanwhile, when the driver wants to start the parked vehicle backward, the driver changes the shift lever position from the position of the parking range "P" to the position of the reverse range "R" while depressing the brake pedal 23a. In this case, the driver usually moves the vehicle gradually backward (through creeping) by the operation on the brake pedal 23a, or releases the brake pedal 23a, and then slightly depresses the accelerator pedal 22a. In other words, when the driver wants to move the vehicle backward, the driver does not depress the accelerator pedal 22a relatively strongly and fast. Conversely, when the accelerator pedal 22a is depressed relatively strongly and fast, the operation on the accelerator pedal 22a is highly likely to be the erroneous depression operation.

Thus, the driving force ECU 10 determines that the erroneous depression operation is performed when the shift lever position is the reverse range "R", and an accelerator operation having the acceleration operation amount equal to or larger than an erroneous-depression determination operation amount and the accelerator operation speed equal to or higher than an erroneous-depression determination operation speed is detected. That is, when the shift lever position is the reverse range "R", and the sudden start operation on the accelerator pedal 22a is detected, the driving force ECU 10 determines that the erroneous depression operation is performed.

When such an erroneous depression operation is detected, the driving force generated by the drive device 30 is decreased to be lower compared with that in the normal state. In the normal state, the driving force ECU 10 sets a driver-requested driving force (target driving force) corresponding to the accelerator operation amount based on a driver-requested-driving-force map, and controls the opening degree of the throttle valve 32 so that the driving force (actual driving force) of the vehicle generated by the drive device 30 approaches the driver-requested driving force. The driver-requested-driving-force map is data that associates the accelerator operation amount and the driver-requested driving force with each other so that the driver-requested driving force increases as the accelerator operation amount increases.

Meanwhile, when the erroneous depression operation is detected, the driving force ECU 10 sets the target driving force as follows. The driving force ECU 10 stores three types (a basic limitation target acceleration map M0, a first mitigation target acceleration map M1, and a second mitigation target acceleration map M2) of target acceleration maps shown in FIG. 4. Each of the target acceleration maps M0, M1, and M2 is data that associates the vehicle speed V at the current time point and a target acceleration Gtarget with each other. When the erroneous depression operation is detected, the driving force ECU 10 selectively uses one of those three types of the target acceleration maps M0, M1 and M2 to set the target driving force.

The basic limitation target acceleration map M0, the first mitigation target acceleration map M1, and the second mitigation target acceleration map M2 are hereinafter referred to as "basic limitation target G map M0", "first mitigation target G map M1" and "second mitigation target G map M2", respectively. Moreover, one map that is specified freely out of the basic limitation target G map M0, the first mitigation target G map M1, and the second mitigation target G map M2 is hereinafter referred to as "target G map M*".

Figure 4:
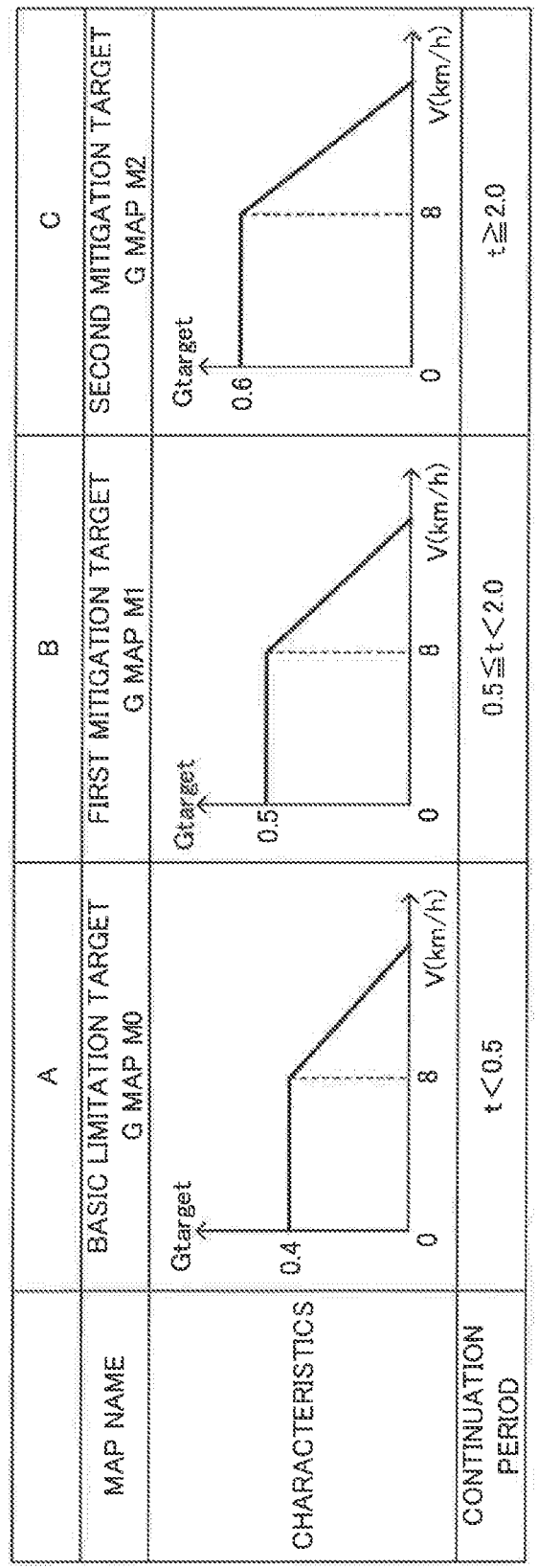
FIG. 4 is a table for illustrating target acceleration maps.

When the erroneous depression operation is detected, the driving force ECU 10 first refers to the basic limitation target G map M0 shown in Column "A" of FIG. 4, to thereby set the target acceleration Gtarget. In this basic limitation target G map M0, when the vehicle is parked, the target acceleration Gtarget is set to 0.4 G.

The driving force ECU 10 calculates the target driving force (referred to as "acceleration-corresponding target driving force") corresponding to a difference ((target–G) between the target acceleration Gtarget corresponding to the vehicle speed V at the current time point set in the basic limitation target G map M0 and the acceleration G (referred to as "actual acceleration G") of the vehicle at the current time point detected by the acceleration sensor 27. The acceleration-corresponding target driving force is calculated through feedback control (such as P control, PI control, or PID control) of causing the difference (Gtarget–G) to converge to zero. In the basic limitation target G map M0, such a target acceleration Gtarget as not to suddenly accelerate the vehicle is set. Thus, even when the driver suddenly depresses the accelerator pedal 22a, the acceleration-corresponding target driving force does not take a large value.

Then, the driving force ECU 10 compares the driver-requested driving force set based on the driver-requested-driving-force map and the acceleration-corresponding target driving force with each other to select a smaller driving force, and sets a value of this driving force as a value of a final target driving force. Thus, the target driving force is set to a value obtained by limiting the driver-requested driving force by the acceleration-corresponding target driving force as an upper limit value. The driving force ECU 10 controls the opening degree of the throttle valve 32 so that the driving force (actual driving force) of the vehicle generated by the drive device 30 approaches the target driving force limited in the manner described above.

Thus, when the erroneous depression operation is detected, the driving force generated by the drive device 30 is decreased by the upper-limit-value limitation to be lower compared with that in the normal state. As a result, an undesired behavior (for example, a sudden backward start) of the vehicle is suppressed. The upper-limit-value limitation may be executed even in the normal state. However, under the state in which the erroneous depression operation is detected, the upper limit value is set to be smaller than an upper limit value in the normal state. The control of limiting the target driving force (the driving force of the vehicle generated by the drive device 30) to be lower compared with the normal state in such a manner is referred to as "driving force limitation control".

Incidentally, when the vehicle moves backward, and rear portions of the wheels abut against a step (a road surface step having a protruded shape), the driver depresses the accelerator pedal 22a strongly so that the wheels can get over the step. This accelerator operation may be determined as the erroneous depression operation. In such a case, the driving force limitation control is executed. When the driving force limitation control is executed, the driving force is decreased, and hence the wheels cannot get over the step in some cases.

Thus, the driving force ECU 10 mitigates (eases) the limitation on the driving force when a state in which the travel of the vehicle is not detected (state in which the vehicle speed V is maintained to be zero even while the accelerator operation is being executed continues for a predetermined period (mitigation start determination period T1, 0.5 second in this embodiment). The control of mitigating the limitation on the driving force is referred to as "driving-force-limitation mitigation control". Moreover, the state in which the travel of the vehicle is not detected even while the accelerator operation is being executed is referred to as "specific state".

In the driving-force-limitation mitigation control in this embodiment, a mitigation level of the driving force limitation is switched between two stages. That is, the mitigation level is set to a first mitigation level after the specific state continues for a predetermined period (mitigation start determination period T1), and is then switched to a second mitigation level after the specific state continues for a predetermined period (level switch determination period T2, 2.0 seconds in this embodiment) while the specific state remains. The second mitigation level is set so that the level of mitigating the limitation on the driving force increases, that is, the upper limit value of the target driving force increases, compared with the first mitigation level.

For example, when the mitigation level is set to the first mitigation level, the first mitigation target G map M1 shown in Column "B" of in FIG. 4 is selected, and the target acceleration Gtarget is set by referring to the first mitigation target G map M1. In this case, the acceleration-corresponding target driving force is calculated based on the difference (Gtarget–G) between the target acceleration Gtarget set in the first mitigation target G map M1 and the actual acceleration G detected by the acceleration sensor 27. Then, the final target driving force is set to the value of a smaller driving force of the driver-requested driving force and the acceleration-corresponding target driving force.

When the mitigation level is set to the second mitigation level, the second mitigation target G map M2 shown in Column "C" of FIG. 4 is selected, and the target acceleration Gtarget is set by referring to the second mitigation target G map M2. In this case, the acceleration-corresponding target driving force is calculated based on the difference (Gtarget–G) between the target acceleration Gtarget set in the second mitigation target G map M2 and the actual acceleration G detected by the acceleration sensor 27. Then, the final target driving force is set to the value of a smaller driving force of the driver-requested driving force and the acceleration-corresponding target driving force.

In the first mitigation target G map M1, a larger target acceleration Gtarget is set compared with the basic limitation target G map M0. Moreover, in the second mitigation target G map M2, a larger target acceleration Gtarget is set compared with the first mitigation target G map M1. As the target acceleration Gtarget increases, the limitation on the driving force is mitigated more (that is, the mitigation level of the driving force limitation is increased).

Thus, even when the wheels cannot get over a step due to the driving force limitation control, the driving force limitation is stepwise mitigated in the course of the control, and hence the wheels come to be able to get over the step.

When the wheels have gotten over the step, the driver releases the foot from the accelerator pedal 22a. As a result, the driving force limitation control is finished. The driving force ECU 10 stores the mitigation level when the wheels have gotten over the step (when the specific state has disappeared). This mitigation level is stored through use of information for identifying the type of the target G map selected when the specific state has disappeared, that is, information for indicating which target G map M* is selected from among the three target G maps M0, M1, and M2. This information is hereinafter referred to as "map-selection history information". Simultaneously, the driving force ECU 10 starts the measurement of a travel distance of the vehicle from the time point when the specific state has disappeared. The travel distance can be measured by counting the pulse signals output by the wheel speed sensor 26.

For example, when the vehicle is traveling backward, the rear wheels have gotten over the step, and then, the front wheels hit that step. When the front wheels hit the step, and the vehicle thus comes to be unable to travel as in the case of the rear wheels, the driver again depresses the accelerator pedal 22a strongly. When this accelerator operation is determined as the erroneous depression operation, the driving force limitation control is resumed. In this case, when the mitigation of the driving force limitation is started after the specific state continues for the predetermined period, and the mitigation level is switched in accordance with the elapse of time as in the case in which the rear wheels has gotten over the step, a period required for the front wheels to get over the step increases. As a result, the driver feels a sense of inconvenience.

When the rear wheels hit the step and the vehicle thus stops (under the first specific state), a degree (difficulty of getting over the step) of a travel resistance by the step is unknown. Therefore, as described above, the driving force limitation control is started after the continuation of the specific state for the predetermined period is confirmed, and the driving force limitation is required to be stepwise mitigated when the specific state continues. This is because when the mitigation level is greatly increased at once, the wheels may get over the step with momentum and then the vehicle may suddenly accelerate, and the driver may feel a sense of unease.

However, when the front wheels hit the step and the travel of the vehicle stops (under the second specific state), the driving force can appropriately be controlled without wasting time through use of the result obtained when the rear wheels got over the step. In this case, the required period for the front wheels to get over the step can be decreased, and it is thus possible to prevent the driver from feeling the sense of inconvenience. Moreover, the wheels do not get over the step with momentum, and the driver does not thus feel the sense of unease, either.

In view of this, when the specific state has disappeared (when the travel of the vehicle is detected), the driving force ECU 10 stores the mitigation level (map-selection history information) at this time point, and starts measurement of the travel distance of the vehicle from the time point when the specific state has disappeared. When a new specific state (current specific state) is subsequently detected, the driving force ECU 10 determines whether or not the travel distance of the vehicle from the time point when the specific state detected last disappeared is a distance corresponding to a wheelbase of the vehicle.

When the travel distance is the distance corresponding to the wheelbase, it is conceivable that the specific states occur for each of the front wheels and the rear wheels due to the common step. Thus, the driving force ECU 10 starts the driving-force limitation mitigation control without waiting for the elapse of the mitigation start determination period T1 when the current specific state is detected. Further, the driving force ECU 10 sets the mitigation level to the mitigation level at the time point when the last specific state disappeared. As a result, the result (the mitigation level; the target G map M* identified by the map-selection history information) obtained when the rear wheels got over the step can directly be used from the beginning to start the driving-force-limitation mitigation control. Thus, the period required for the front wheels to get over the step can be reduced.

<Driving Force Control Routine>

Figure 2:
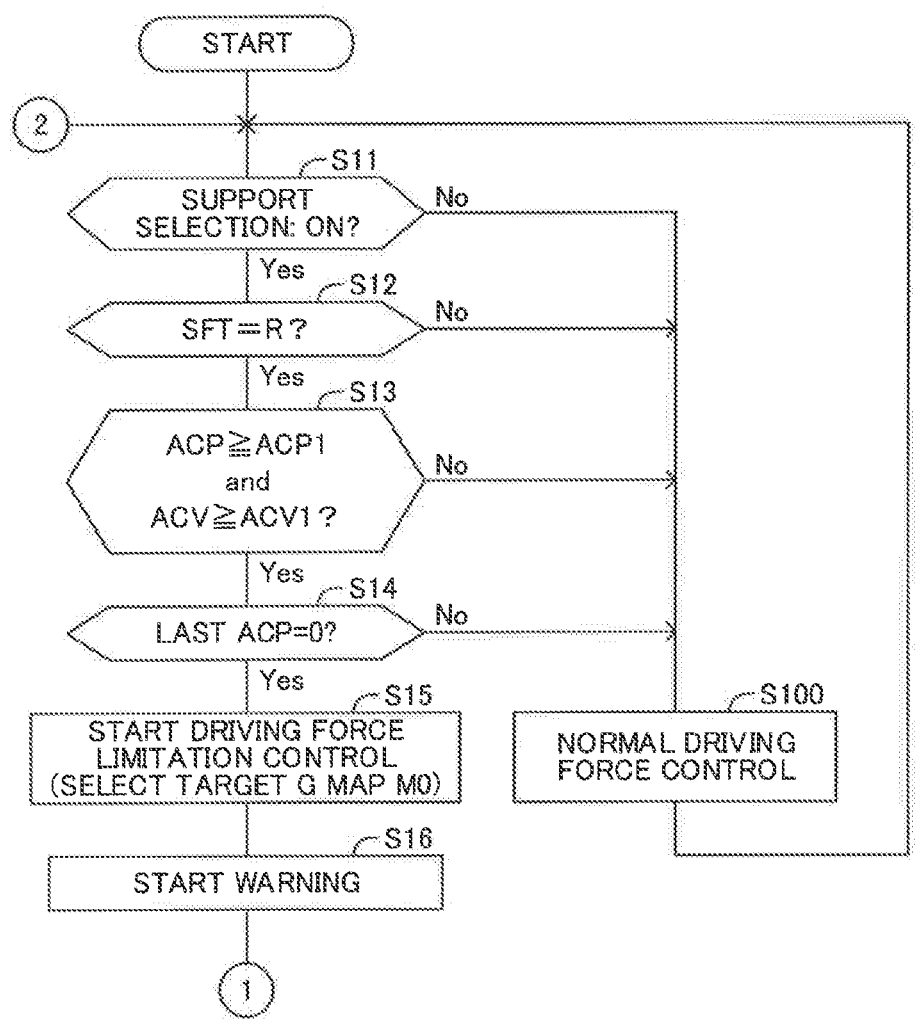
FIG. 2 is a flowchart for illustrating a driving force control routine (first half).
Figure 3:
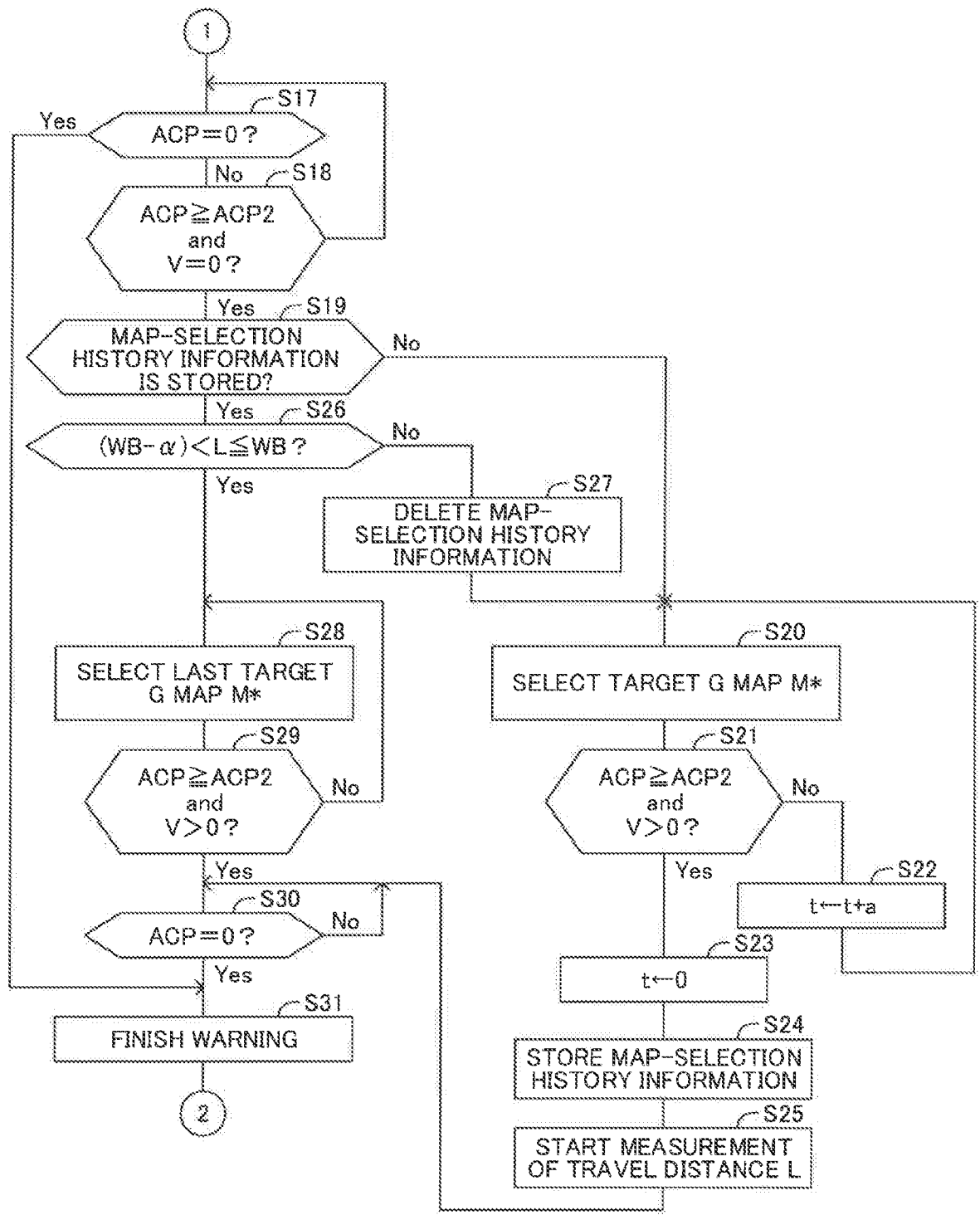
FIG. 3 is a flowchart for illustrating the driving force control routine (second half).

A specific description is now given of the processing to be executed by the driving force ECU 10 described above with reference to flowcharts. FIG. 2 and FIG. 3 are flowcharts for illustrating a driving force control routine to be executed by the driving force ECU 10. The driving force ECU 10 executes the driving force control routine while assuming that the brake operation is not detected by the brake switch 23. For example, when the brake operation and the accelerator operation are simultaneously detected, the brake operation is prioritized, and the braking force is controlled by the brake ECU (not shown).

When the driving force ECU 10 starts the driving force control routine, first in Step S11, the driving force ECU 10 determines whether or not the current mode is the mode in which the execution of the erroneous-depression-sudden-start suppression support is permitted by the support selection switch 21.

When the execution of the erroneous-depression-sudden-start suppression support is not permitted (No in Step S11), the driving force ECU 10 advances its processing to Step S100. In Step S100, the driving force ECU 10 executes normal driving force control. The normal driving force control is driving force control to be executed when the erroneous-depression-sudden-start suppression support is not executed. The normal driving force control is control of setting the driver-requested driving force corresponding to the accelerator operation amount ACP (for example, proportional to the accelerator operation amount ACP), and adjusting the opening degree of the throttle valve 32 so that the driving force (actual driving force) of the vehicle generated by the drive device 30 approaches the driver-requested driving force.

When the execution of the erroneous-depression-sudden-start suppression support is permitted by the support selection switch 21 (Yes in Step S11), the driving force ECU 10 determines whether or not an erroneous-depression determination condition is satisfied. The erroneous-depression determination condition is a condition for determining whether or not the erroneous depression operation is performed.

The erroneous-depression determination condition in this embodiment is set as follows.

Determination condition 1: The shift position SFT is the reverse range "R".

Determination condition 2: The accelerator operation amount ACP is equal to or larger than an erroneous-depression determination operation amount ACP1, and an accelerator operation speed ACV is equal to more than an erroneous-depression determination operation speed ACV1, immediately after the accelerator operation is started.

The erroneous-depression determination condition is satisfied when both the determination condition 1 and the determination condition 2 are satisfied.

The driving force ECU 10 executes determination processing in Step S12 to Step S14 in order to determine presence or absence of the erroneous depression operation. First, in Step S12, the driving force ECU 10 reads the shift position SFT, which is the detection signal of the shift position sensor 24, to thereby determine whether or not the shift position SFT is the reverse range "R". When the shift position SFT is not the reverse range "R" (No in Step S12), the erroneous-depression determination condition is not satisfied, and hence the driving force ECU 10 advances its processing to Step S100. Meanwhile, when the shift position SFT is the reverse range "R", the driving force ECU 10 advances its processing to Step S13.

In Step S13, the driving force ECU 10 reads the accelerator operation amount ACP from the accelerator position sensor 22, and determines whether or not the accelerator operation amount ACP is equal to or larger than the erroneous-depression determination operation amount ACP1, and whether or not the accelerator operation speed ACV is equal to or higher than the erroneous-depression determination operation speed ACV1. The driving force ECU 10 reads the accelerator operation amount ACP at a predetermined short cycle while executing the driving force control routine, to thereby calculate the accelerator operation speed ACV, which is a change amount of the accelerator operation amount ACP per unit time, based on a temporal transition of the acceleration operation amount ACP in a last predetermined period of time.

When the driving force ECU 10 makes a determination of "No" in Step S13, the driving force ECU 10 advances its processing to Step S100. When the driving force ECU 10 makes a determination of "Yes", the driving force ECU 10 advances its processing to Step S14. In Step S14, the driving force ECU 10 determines whether or not the last accelerator operation amount ACP is zero. This determination processing is determination of whether or not the current time point is immediately after the start of the accelerator operation. Thus, in Step S14, it is determined whether or not the accelerator operation amount ACP a predetermined period (a period sufficient for the determination of whether or not the accelerator operation has started immediately before) before the current time point is zero.

When the driving force ECU 10 makes a determination of "No" in Step S14, the driving force ECU 10 advances its processing to Step S100. Thus, when the erroneous-depression determination condition is not satisfied, the normal driving force control is executed. The driving force ECU 10 repeatedly executes the determination processing of from Step S11 to Step S14 while executing the normal driving force control. Then, when the erroneous depression determination condition is satisfied (Yes in Step S12 to Step S14), the driving force ECU 10 advances its processing to Step S15.

In Step S15, the driving force ECU 10 starts the driving force limitation control. For the execution of the driving force limitation control, the driving force ECU 10 refers to the basic limitation target G map M0 shown in Column "A" of FIG. 4 to set the target acceleration Gtarget corresponding to the vehicle speed V at the current time point, and calculates the target driving force (acceleration-corresponding target driving force) corresponding to the difference (Gtarget–G) between the target acceleration Gtarget and the actual acceleration G at the current time point detected by the acceleration sensor 27. The driving force ECU 10 compares the driver-requested driving force set based on the driver-requested-driving-force map and the acceleration-corresponding target driving force with each other to select a smaller value of the driving force, and sets the selected value as a value of a final target driving force. The driving force ECU 10 controls the opening degree of the throttle valve 32 so that the driving force (actual driving force) of the vehicle generated by the drive device 30 approaches the set target driving force limited in the manner described above.

Thus, the target driving force is limited so as not to increase even when the driver suddenly depresses the accelerator pedal 22a, and hence the vehicle is prevented from being suddenly starting traveling backward.

Then, in Step S16, the driving force ECU 10 starts the warning to the driver. In this case, the driving force ECU 10 transmits to the display 28 a display signal for causing the display 28 to display a warning screen for prompting the driver to release the foot from the accelerator pedal. Further, the driving force ECU 10 transmits to the speaker 29 a warning sound output signal for causing the speaker 29 to output the warning sound (for example, a buzzer sound). In such a manner, attention of the driver is attracted by the buzzer sound, and the driver is prompted to release the foot from the accelerator pedal by the display of the display 28. In place of the buzzer sound, a sound guidance may be generated from the speaker 29, to thereby prompt the driver to release the foot from the accelerator pedal.

Then, in Step S17, the driving force ECU 10 determines whether or not the accelerator operation amount ACP is 0, that is, whether or not the foot of the driver is released from the accelerator pedal 22a. When the determination processing in Step S17 is executed for the first time, a determination of "No" is made. In this case, the driving force ECU 10 advances its processing to Step S18.

In Step S18, the driving force ECU 10 determines whether or not the vehicle is in the state in which the vehicle cannot travel due to an external travel load, that is, in the specific state. In this case, the driving force ECU 10 determines whether or not the accelerator operation amount ACP is equal to or larger than a reference operation amount ACP2, and the vehicle speed V is zero. When the driving force ECU 10 determines that the state at the current time point is not the specific state (No in Step S18), the driving force ECU 10 returns its processing to Step S17. Thus, the driving force ECU 10 repeatedly executes the determination processing in Step S17 and Step S18.

When the driver executes the erroneous depression operation, the attention of the driver is attracted by the warning screen display and the buzzer sound, and the driver releases the foot from the accelerator pedal 22a. As a result, the accelerator operation amount ACP becomes 0 (Yes in Step S17), and the driving force ECU 10 advances its processing to Step S31. In Step S31, the driving force ECU 10 finishes the warning to the driver, which has been executed, and returns its processing to the first processing (Step S11). As a result, in Step S13, a determination of "No" is made, the driving force limitation control is finished, and the normal driving force control is started (Step S100).

Meanwhile, when the specific state is detected during the repetition of the determination processing in Step S17 and Step S18 (Yes in Step S18), the driving force ECU 10 determines in Step S19 whether or not the map-selection history information has been stored. The map-selection history information is the information indicating the type (any one of the basic limitation target G map M0, the first mitigation target G map M1, and the second mitigation target G map M2) of the target G map M* to be stored in Step S24 described later.

When the determination processing in Step S19 is executed for the first time, the map-selection history information has not yet been stored. In this case, the driving force ECU 10 advances its processing to Step S20. In Step S20, the driving force ECU 10 selects one from among the three target G maps M0, M1, and M2 shown in FIG. 4. In this case, the driving force ECU 10 measures a period of time "t" during which the specific state continues. The period of time "t" is hereinafter referred to as "continuation period t", and selects the target G map M* corresponding to the continuation period t of the specific state. When the processing in Step S20 is executed for the first time, the specific state was detected immediately before (Yes in Step S18), and the continuation period t is thus zero seconds. The continuation period t is measured in Step S22 described later.

As illustrated in FIG. 4, when the continuation period t of the specific state is shorter than 0.5 second (t<0.5), the driving force ECU 10 selects the basic limitation target G map M0. When the continuation period t of the specific state is equal to or longer than 0.5 second and shorter than 2.0 seconds (0.5≤t<2.0), the driving force ECU 10 selects the first mitigation target G map M1. When the continuation period t of the specific state is equal to or longer than 2.0 seconds (2.0≤t), the driving force ECU 10 selects the second mitigation target G map M2.

When the processing in Step S20 is executed for the first time, the basic limitation target G map M0 is selected. The basic limitation target G map M0 is the same as the target G map M* selected in Step S15, that is, the target G map M* used for the driving force limitation control executed at the current time point. Thus, at the beginning of the detection of the specific state, the driving force limitation control continues without a change.

Subsequently, in Step S21, the driving force ECU 10 determines whether or not the specific state has disappeared, that is, whether or not the travel of the vehicle is started. In this case, the driving force ECU 10 determines whether or not the accelerator operation amount ACP is equal to or larger than the reference operation amount ACP2, and the vehicle speed V is higher than zero. When the specific state remains (No in Step S21), the driving force ECU 10 advances its processing to Step S22.

In Step S22, the driving force ECU 10 sets a value obtained by adding a predetermined value "a" to the timer value "t" as the continuation period t (t=t+a). The predetermined value "a" corresponds to a calculation cycle of the repetition of the processing of from Step S20 to Step S22. An initial value of the timer value "t" is zero seconds.

After the driving force ECU 10 calculates the continuation period t, the driving force ECU 10 returns its processing to Step S20. Thus, while the specific state continues, the processing of from Step S20 to Step S22 is repeated. As a result, the target G map M* corresponding to the continuation period t of the specific state is selected. The driving force ECU 10 calculates the acceleration-corresponding target driving force based on the difference (Gtarget−G) between the target acceleration Gtarget corresponding to the selected target G map M* and the actual acceleration G detected by the acceleration sensor 27, and sets the value of a smaller one of the driver-requested driving force and the acceleration-corresponding target driving force as the value of the final target driving force.

The driving force limitation is stepwise mitigated through the repetition of this processing. Then, when the driving force overcomes the travel resistance, the wheels get over the step, and the travel of the vehicle is started.

When the travel of the vehicle is detected (when the vehicle speed V increases to be higher than 0), the driving force ECU 10 advances its processing to Step S23, and clears the timer value "t", that is, the continuation period t to zero. Then, in Step S24, the driving force ECU 10 stores the map-selection history information, which is information (information indicating which target G map M* is selected out of the three target G maps M0, M1, and M2) indicating the target G map M* selected at the current time point. In other words, the driving force ECU 10 stores the mitigation level of the driving force limitation at the time when the specific state has disappeared. In this case, when the map-selection history information is already stored, the driving force ECU 10 deletes the old map-selection history information, and stores the map-selection history information indicating the target G map M* selected at the current time point.

Then, in Step S25, the driving force ECU 10 starts measurement of a travel distance L of the vehicle. That is, the measurement of the travel distance L of the vehicle from the time point when the specific state has disappeared is started. In one embodiment, the driving force ECU 10 may finish the measurement of the travel distance L, and clear the value of the travel distance L to zero at timing at which the travel distance L exceeds the distance corresponding to a wheelbase WB by a predetermined value or larger.

Then, the driving force ECU 10 advances its processing to Step S30 to determine whether or not the accelerator operation amount ACP is 0, that is, whether or not the foot of the driver is released from the accelerator pedal 22a. The driving force ECU 10 waits until the accelerator operation amount ACP becomes 0. While waiting (No in Step S30), the driving force ECU 10 executes the driving force limitation control based on the basic limitation target G map M0, but, in place of the driving force limitation control, the driving force ECU 10 may continue, without change, the driving force control based on the target G map M* that has been selected last. Then, when the driving force ECU 10 detects the state in which the accelerator operation amount ACP has become 0, the driving force ECU 10 advances its processing to Step S31. As a result, the warning to the driver is finished, and the normal driving force control is started (Step S100).

The driving force ECU 10 repeatedly executes the above-mentioned processing. Thus, each time the erroneous depression operation is detected, the driving force limitation control is started in place of the normal driving force control. When the rear wheels hit the step during the driving force limitation control, and the travel of the vehicle thus stops, the specific state is detected. Then, the target G map M* corresponding to the continuation period t of the specific state is selected, and the upper limit limitation on the driver-requested driving force is mitigated. As a result, the rear wheels get over the step, and the specific state thus disappears. At this time, the map selection history information indicating the type of the selected target G map M* is stored, and the measurement of the travel distance L of the vehicle is started.

When the rear wheels get over the step, and the driver releases the foot from the accelerator pedal 22a, the normal driving force control is started, but the front wheels hit the step this time. When the driver depresses the accelerator pedal 22*a* strongly to get over the step, the erroneous-depression determination condition is again satisfied (Yes in Steps S12 to Step S14), and the driving force ECU 10 starts the processing from Step S15.

Then, when the specific state is detected (Yes in Step S18), the driving force ECU 10 determines in Step S19 whether or not the map-selection history information has been stored. In this case, the map-selection history information for identifying the target G map M* at the time when the rear wheels got over the step (when the last specific state disappeared) has been stored, and hence the driving force ECU 10 makes a determination of "Yes" and advances its processing to Step S26.

In Step S26, the driving force ECU 10 reads the measured travel distance L at the current time point, and determines whether or not the travel distance L is the distance corresponding to the wheelbase of the vehicle. In this embodiment, the distance corresponding to the wheelbase to be used for this determination means a value that falls within a range that is longer than a value (WB−α) obtained by subtracting a predetermined distance "α" from the wheelbase WB of the vehicle, and is equal to or shorter than the wheelbase WB. Thus, in Step S26, when the travel distance L is longer than the value (WB−α) and equal to or shorter than the wheelbase WB ((WB−α)<L≤WB)) a determination of "Yes" is made. This predetermined distance "α" is a positive value to which a dead zone is set in consideration of various errors.

The distance corresponding to the wheelbase may be set to a value that falls within a range of from (WB−α) to (WB+β). A value "β" is a positive value to which a dead zone is set in consideration of various errors. In this case, in Step S26, for example, when the travel distance L satisfies a condition ((WB−α)<L≤(WB+β)), a determination of "Yes" is made.

When the travel distance L of the vehicle is the distance corresponding to the wheelbase, it is considered that, this time, the front wheels hit the step which the rear wheels have gotten over, and the travel of the vehicle stops. Therefore, it can be estimated that the travel resistance (the difficulty with which the vehicle gets over the step) of the step in the current specific state and the travel resistance of the step in the last specific state are the same.

When the driving force ECU 10 determines that the travel distance L is the distance corresponding to the wheelbase of the vehicle (Yes in Step S26), the driving force ECU 10 advances its processing to Step S28, and selects the target G map M* identified by the map-selection history information stored in Step S24, that is, the target G map M* at the time when the rear wheels got over the step. Thus, the target driving force appropriate for the front wheels to get over the step is calculated immediately after the current specific state is detected, and the throttle motor 31 is controlled so that the drive device 30 generates the target driving force.

Subsequently, in Step S29, the driving force ECU 10 determines whether or not the specific state has disappeared, that is, whether or not the travel of the vehicle is started. In this case, the driving force ECU 10 determines whether or not the accelerator operation amount ACP is equal to or larger than the reference operation amount ACP2, and the vehicle speed V is higher than zero. When the specific state remains (No in Step S29), the driving force ECU 10 returns its processing to Step S28. Thus, while the specific state remains, the target S map M* at the time when the rear wheels got over the step is used to control the driving force as described above.

When such processing is repeated, and the specific state thus has disappeared (Yes in Step S29), the driving force ECU 10 advances its processing to Step S30, and executes the above-mentioned processing.

Meanwhile, when a determination of "No" is made in Step S26, that is, when the travel distance L is determined not to be the distance corresponding to the wheelbase of the vehicle, the driving force ECU 10 advances its processing to Step S27. When the travel distance L is not the distance corresponding to the wheelbase of the vehicle, this case does not mean that the specific state is detected twice for a common step.

Figure 5:
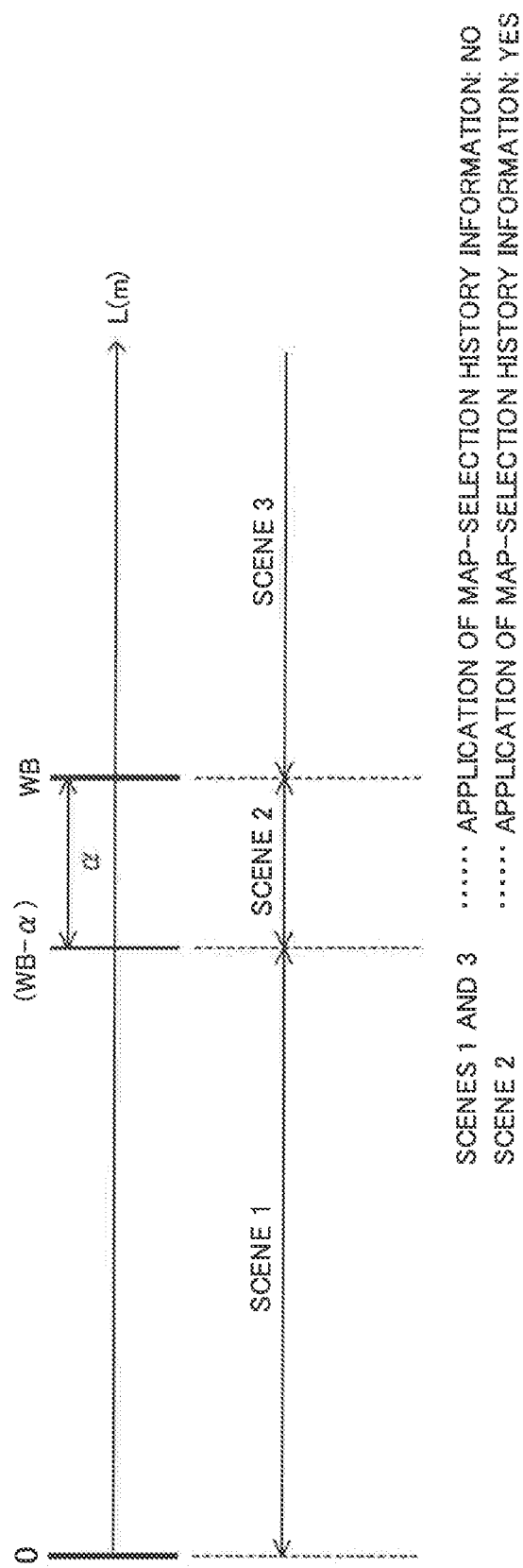
FIG. 5 is a diagram for illustrating scenes in accordance with a travel distance after it is determined that rear wheels have gotten over a step.

For example, as illustrated in a scene 1 of FIG. 5, when the travel distance L is equal to or less than (WB−α), and the specific state is detected, it is considered that, after the rear wheels got over the step, the rear wheels hit another step before the front wheels hit the same step, and the travel of the vehicle stops (the second specific state is detected). Moreover, as illustrated in a scene 3 of FIG. 5, when the specific state is detected after the travel distance L exceeds the wheelbase WB, it is considered that, after the rear wheels got over a step, the front wheels get over the step without the stop of the vehicle travel, the rear wheels then hit another step, and the travel of the vehicle stops (the second specific state is detected). In those scenes 1 and 3, the specific state is detected twice not for a common step. Therefore, the target G map M* at the time when the rear wheels got over the step should not be used.

Thus, in Step S27, the driving force ECU 10 deletes the stored map-selection history information, and advances its processing to Step S20. As a result, the target S map M* corresponding to the continuation period t of the specific state is selected. In such a manner, the driving-force-limitation mitigation control corresponding to a new step is executed.

With the driving force control apparatus according to this embodiment, when the specific state has disappeared, the map-selection history information for identifying the target S map M* selected at the current time point is stored, and the measurement of the travel distance L of the vehicle is started from the current time point. Then, when the next specific state is detected, and the travel distance L is the distance corresponding to the wheelbase, the target G map identified by the map-selection history information is selected, and the driving-force-limitation mitigation control is executed in accordance with this target S map M*. As a result, when the specific state is successively detected twice, the start timing of the second driving-force-limitation mitigation control can be prevented from being delayed, and hence the vehicle can smoothly get over a step in accordance with the intention of the driver. Thus, R is possible to prevent the driver from feeling the sense of inconvenience.

In the above, the driving force control apparatus according to this embodiment has been described, but the present disclosure is not limited to the above-mentioned embodiment, and various modifications may be made thereto without departing from the object of the present disclosure.

For example, in this embodiment, the number of the stages of the mitigation level of the driving force limitation is set to two, but the number of the stages of the mitigation level may be three or more. Moreover, the number of the stages of the mitigation level of the driving force limitation may be fixed to one. In this case, for example, the driving force limitation may be mitigated only in accordance with the first mitigation target G map M1 without using the second mitigation target G map M2.

Moreover, in this embodiment, in order to mitigate the driving force limitation, the target acceleration Gtarget is set to limit the driving force through the upper limit for the driver-requested driving force, but it is not always required to set the target acceleration Gtarget. For example, a plurality of upper limit values for limiting the driver-requested driving force may be prepared, and the upper limit value may be stepwise increased as the continuation period t of the specific state increases.

Moreover, in this embodiment, the internal combustion engine is used as the drive device 30, but a drive device including an electric motor or a combination of an internal combustion engine and an electric motor may also be used.

What is claimed is:

1. A driving force control apparatus, comprising:
an electronic control unit (ECU) configured to:
control a driving force to be generated by a drive device for a vehicle in accordance with an operation amount of an accelerator pedal;
detect an erroneous depression operation, which is an operation by a driver of depressing the accelerator pedal by mistake, based on an erroneous-depression determination condition set in advance;
execute driving force limitation control, which is control of limiting the driving force, when the erroneous depression operation is detected;
detect a specific state indicating whether travel of the vehicle is not detected in a case in which the accelerator pedal is operated while the driving force is limited due to the driving force limitation control;
start driving-force-limitation mitigation control, which is control of mitigating the limitation on the driving force due to the driving force limitation control, when the specific state is continued to be detected for a predetermined period set in advance or longer,
acquire a travel distance of the vehicle between a time point when the specific state detected last disappeared and a time point when the specific state is currently detected, and determine whether the travel distance is a distance corresponding to a wheelbase of the vehicle; and
resume the driving-force-limitation mitigation control without requiring the specific state currently detected to continue for the predetermined period or longer, when the travel distance acquired when the specific state is currently detected is determined to be the distance corresponding to the wheelbase,
wherein the erroneous-depression determination condition is a condition for detecting a sudden start operation on the accelerator pedal.

2. The driving force control apparatus according to claim 1, wherein the ECU is further configured to:
measure a continuation period during which the specific state continues, and increase a mitigation level of mitigating the limitation on the driving force as the continuation period increases;
store the mitigation level at a time when the specific state disappears; and
set the mitigation level stored in the mitigation level storage as a mitigation level at a time of a start of the driving-force-limitation mitigation control, when a new specific state is detected under a condition in which the mitigation level is stored in the mitigation level storage, and when the travel distance is the distance corresponding to the wheelbase of the vehicle.

3. The driving force control apparatus according to claim 1, wherein the erroneous-depression determination condition includes a condition relating to an operation speed of the accelerator pedal and a condition relating to an operation amount of the accelerator pedal.

* * * * *